United States Patent
Jang

(10) Patent No.: US 8,219,732 B2
(45) Date of Patent: Jul. 10, 2012

(54) METHOD FOR MANAGING STATE IN A WIRELESS NETWORK

(75) Inventor: Tae-Ho Jang, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 841 days.

(21) Appl. No.: 11/715,168

(22) Filed: Mar. 7, 2007

(65) Prior Publication Data

US 2007/0288620 A1  Dec. 13, 2007

(30) Foreign Application Priority Data

Mar. 7, 2006  (KR) .................... 10-2006-0021348

(51) Int. Cl.
*G06F 13/24* (2006.01)

(52) U.S. Cl. ......... 710/261; 710/260; 710/240; 710/200
(58) Field of Classification Search .......... 710/260–269, 710/305–306, 240–244, 200; 370/469
See application file for complete search history.

(56) References Cited

U.S. PATENT DOCUMENTS

| | | | | |
|---|---|---|---|---|
| 6,065,073 A | * | 5/2000 | Booth | 710/46 |
| 6,757,750 B2 | * | 6/2004 | Chiang | 710/16 |
| 6,768,720 B1 | * | 7/2004 | Kamstra et al. | 370/245 |
| 6,839,345 B2 | * | 1/2005 | Lu et al. | 370/365 |
| 7,079,551 B2 | * | 7/2006 | Shivnan | 370/469 |
| 7,197,588 B2 | * | 3/2007 | Tsao et al. | 710/268 |
| 2003/0140296 A1 | * | 7/2003 | Odman | 714/749 |

* cited by examiner

*Primary Examiner* — Brian Misiura
*Assistant Examiner* — Kim Huynh
(74) *Attorney, Agent, or Firm* — NSIP Law

(57) ABSTRACT

A method for managing states by a Media Access Control (MAC) layer in a wireless network is disclosed. The method includes determining next occurable physical interrupts for each of the states; configuring a link of the states according to the determination result; transitioning to a state to be linked next if a physical interrupt occurs in each state; and transitioning to an initial state if an timer interrupt occurs in each state. The MAC layer transitions to the initial state if a physical interrupt occurs in a last state among the linked states. The physical interrupt occurs in association with a physical event, and the timer interrupt occurs in association with a timer event.

11 Claims, 7 Drawing Sheets

METHOD FOR MANAGING STATE IN A WIRELESS NETWORK

PRIORITY

This application claims the benefit under 35 U.S.C. §119 (a) of a Korean Patent Application filed in the Korean Intellectual Property Office on Mar. 7, 2006 and assigned Serial No. 2006-21348, the disclosure of which is incorporated herein by reference.

BACKGROUND OF THE INVENTION

1. Field of the Invention

The present invention relates generally to a method for managing states in a wireless network, and in particular, to a method for software-processing a state management function (also known as a "state machine") for implementing a wireless Media Access Control protocol.

2. Description of the Related Art

Generally, in wireless networks, state management is achieved by a Media Access Control (MAC) layer. In design of Software Defined MAC (SDM) based on a state machine, substantial events include various types of events in which interrupts are not taken into consideration. Such events cause an increase in complexity of an event routine, i.e. Interrupt Service Routine (ISR), thus considerably affecting performance of the MAC layer.

Generally, in a MAC protocol, a state machine is expressed as Finite State Machine (FSM). In the state machine, an event participating in state transition is an interrupt. An interrupt associated with the MAC protocol occurs in a physical layer and a timer.

FIG. 1 illustrates state transition achieved by a MAC layer in the conventional wireless network.

As can be understood from FIG. 1, there are various states which are managed by a state machine performed by the MAC layer. The states managed by the state machine can be listed as shown in Table 1.

TABLE 1

| Condition | Description | PHY Intr | Timer Intr |
|---|---|---|---|
| C_1 | New frame ready to send | | Internal Event 1 |
| C_2 | Backoff needed for Collision Avoidance | | Internal Event 2 |
| C_3 | DIFS Defer ends and transmit ready | | DIFS Time out |
| C_4 | Backoff period ends | | Backoff Time out |
| C_5 | RTS sent | Frm Tx End | |
| C_6 | CTS received | Frm Rx End | |
| C_7 | Frame ready to transmit | | Internal Event 3 |
| C_8 | SIFS Defer ends | | SIFS Time out |
| C_9 | Frame sent to physical layer | Frm Tx End | |
| C_10 | ACK message received | Frm Rx End | |
| C_11 | Frame sent to physical layer | Frm Tx End | |
| C_12 | CTS not received and retry limit reached | | SIFS Time out |
| C_13 | External events happening, new packet arrives from upper layer or physical layer | | |

Referring to Table 1, state management is achieved in a MAC layer, but an interrupt corresponding to an event is achieved by an operation of a physical layer and a timer. That is, conventionally, the relationship between a state machine achieved in the MAC layer and an interrupt achieved by the physical layer and the timer is not taken into consideration.

FIG. 2 illustrates operation state transition based on an event occurring in the conventional wireless network.

Referring to FIG. 2, it can be apparently noted that transition of an operation state by a state machine in a MAC layer and occurrence of an interrupt corresponding to each event are separated from each other.

As described above, in the state machine achieved in the existing wireless network, as an event manager gathers interrupts and internal events before sending, the event routine is high in its complexity. In addition, as the event manager gathers interrupts and internal events before sending, the state machine is dependent on the system timer and participates in state transition in response not only to the interrupts but also to the internal events, causing an inevitable increase in the complexity. Further, when the state machine is managed in the ISR, there are multiple comparison branch statements during processing in FSM Instance, causing management difficulty.

SUMMARY OF THE INVENTION

An aspect of the present invention is to address at least the problems and/or disadvantages and to provide at least the advantages described below. Accordingly, an aspect of the present invention is to provide a configuration of a state machine capable of expressing state transition as an interrupt to improve performance of a MAC layer, and a processing method thereof.

Another aspect of the present invention is to provide a scheme for designing a MAC layer based on a state machine through MAC protocol grouping.

Further another aspect of the present invention is to provide a scheme for designing a MAC layer based on physical events and timer events.

According to one aspect of the present invention, there is provided a method for managing states by a Media Access Control (MAC) layer in a wireless network. The method includes determining next occurable physical interrupts for each of the states; configuring a link of the states according to the determination result; transitioning to a state to be linked next if a physical interrupt occurs in each state; and transitioning to an initial state if an timer interrupt occurs in each state.

Preferably, the MAC layer transitions to the initial state if a physical interrupt occurs in a last state among the linked states.

Preferably, the physical interrupt occurs in association with a physical event, and the timer interrupt occurs in association with a timer event.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

Figure 1:
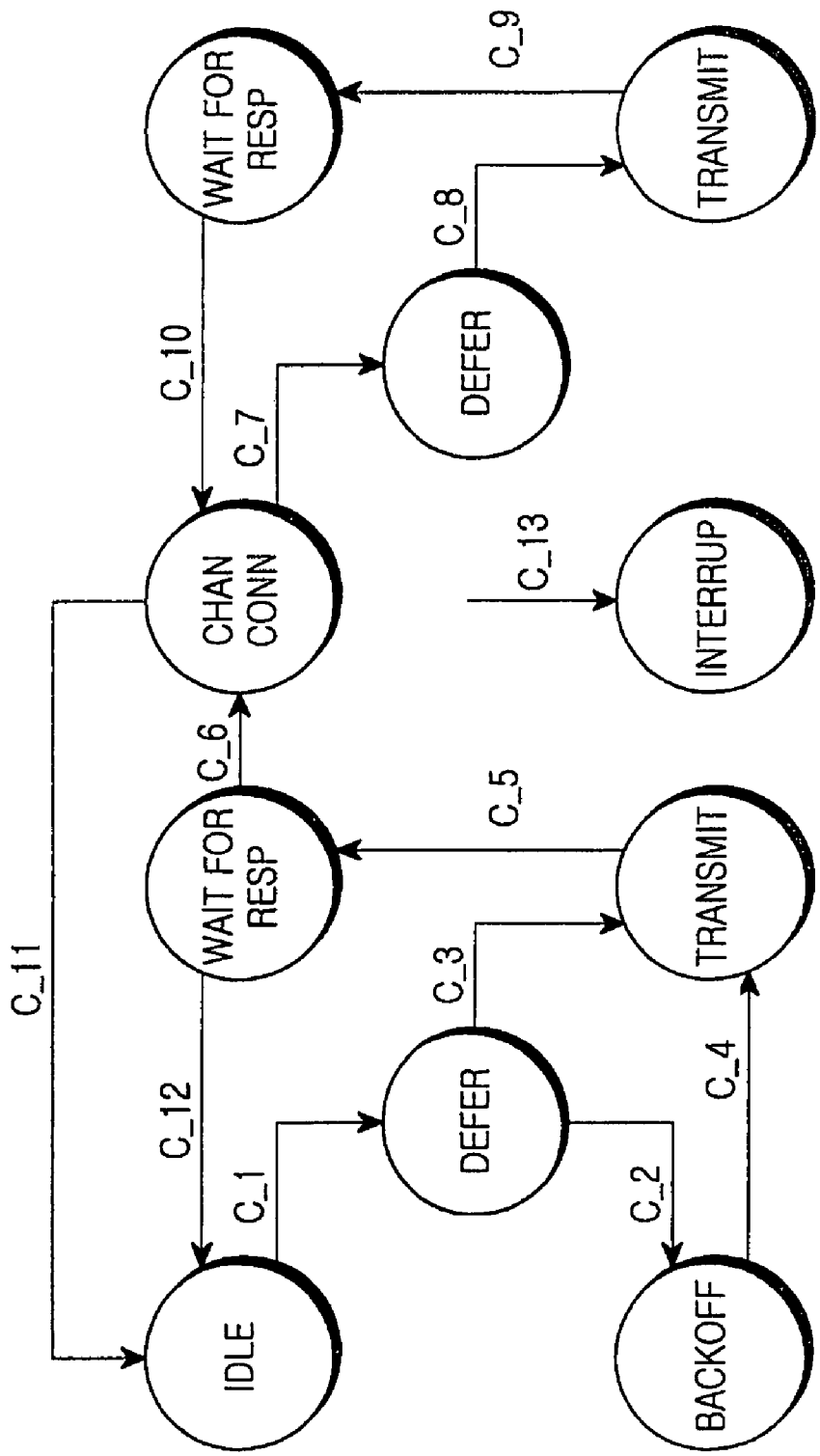
FIG. 1 is a diagram illustrating state transition achieved by a MAC layer in the conventional wireless network.
Figure 2:
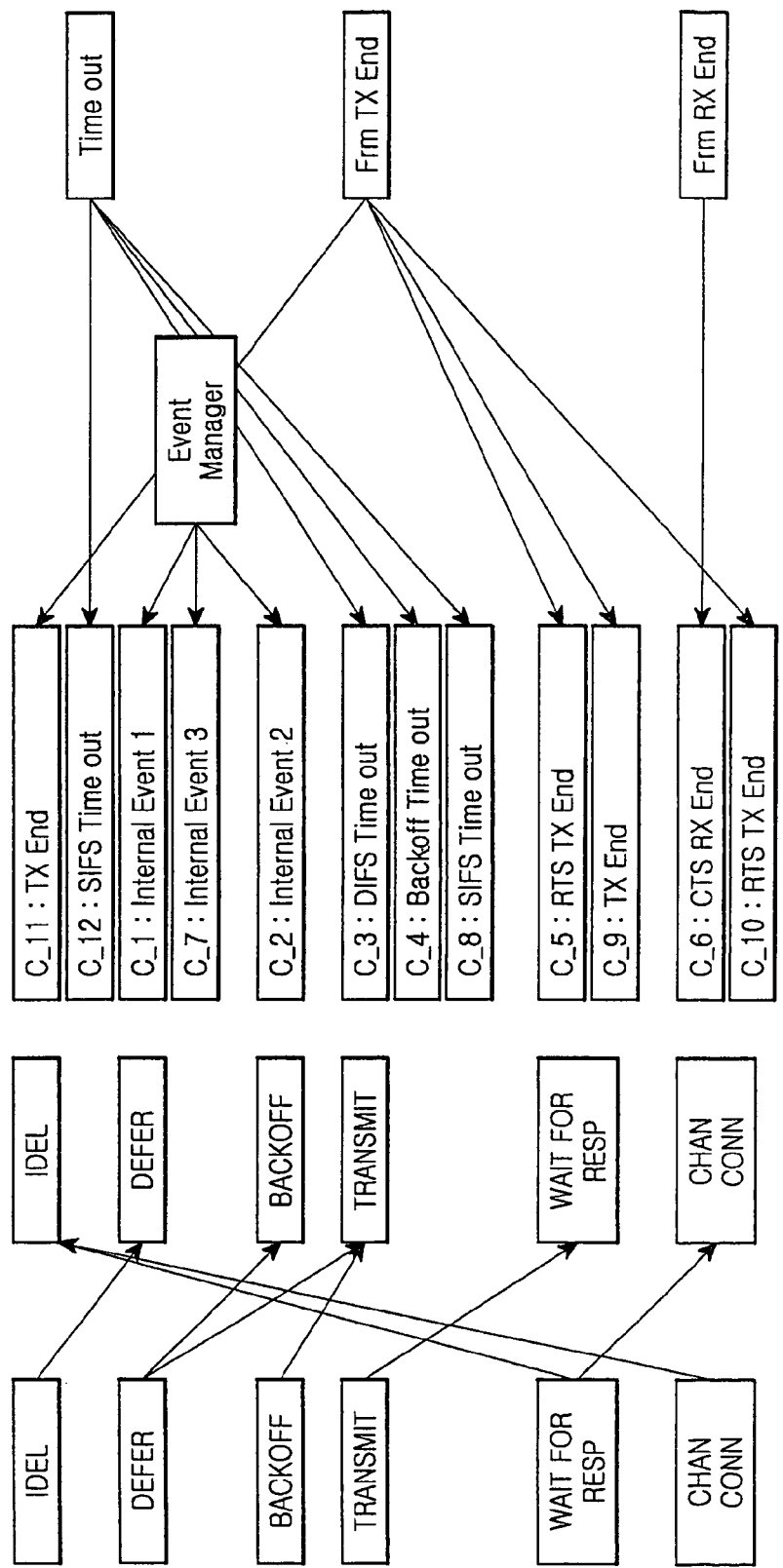
FIG. 2 is a diagram illustrating operation state transition based on an event occurring in the conventional wireless network.
Figure 3:
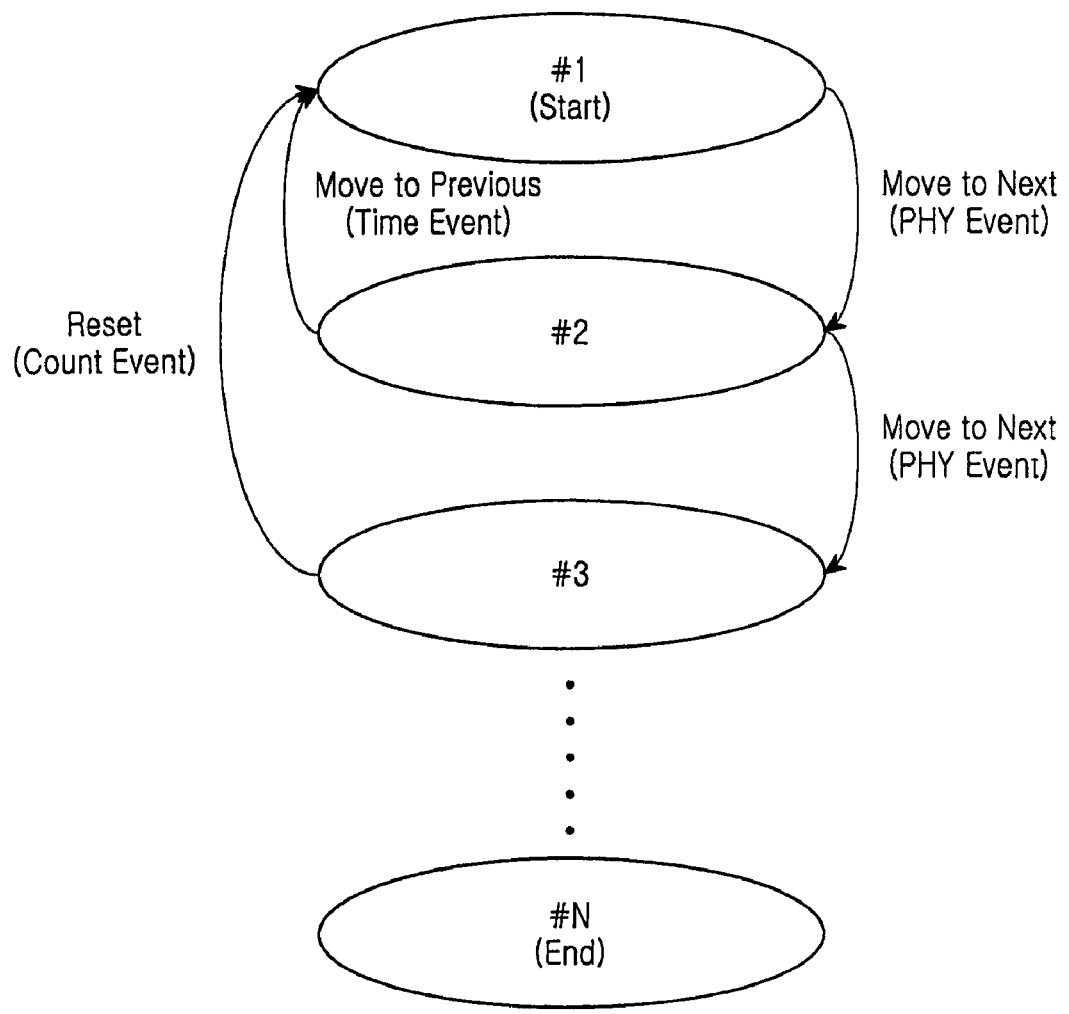
FIG. 3 is a diagram conceptually illustrates state transition based on a state management method proposed in the present invention.

FIG. 3 conceptually illustrates state transition based on a state management method proposed in the present invention.

Referring to FIG. 3, there are N states STATE #1 to STATE #N. When an event occurs in each state, the state management method allows transition to the next state. That is, if a physical event (PHY Event) occurs in a particular state, the method moves to the next state. However, if a time event (Time Event) occurs in a particular state, the method moves to the previous state. In addition, if a count event (Count Event) occurs in a particular state, the method moves to the initial state by resetting the current state.

As described above, the present invention divides the possible interrupts occurring in a state machine into interrupts (Time Interrupts) occurring by a timer and physical events (PHY Interrupts). The interrupts occurring by the timer occur due to the expiration of a set time. The physical events occur due to a time critical path.

For the interrupts occurring by the timer, the state management method allows transition from the current state to the initial state. However, for the physical interrupts, the method allows transition from the current state to the next state, and only when physical interrupts occur in the last state of the state link, the method allows transition to the initial state.

Figure 4:
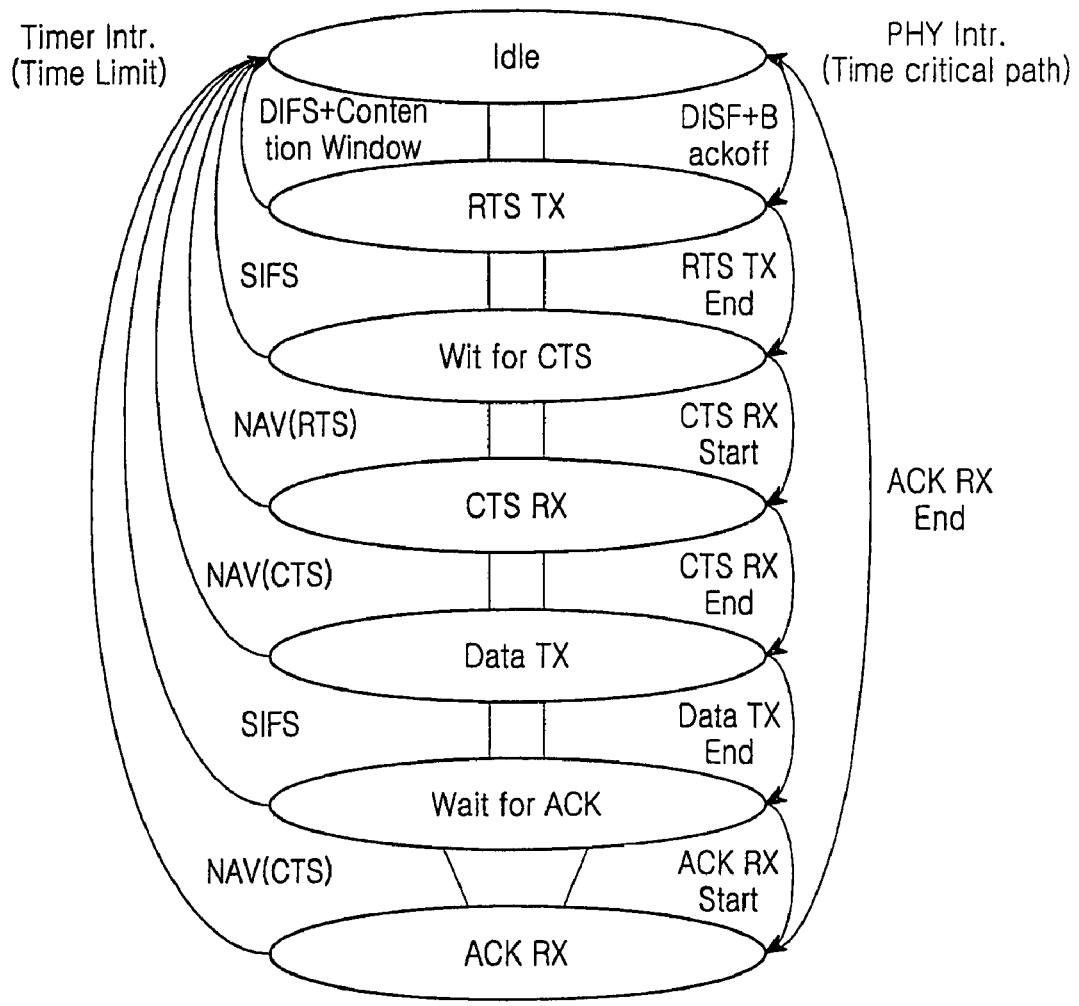
FIG. 4 is a diagram illustrating an example of state transition by a state machine in a MAC layer according to an embodiment of the present invention.

FIG. 4 illustrates an example of state transition by a state machine in a MAC layer according to an embodiment of the present invention.

Referring to FIG. 4, if a 'DISF+Back off' event occurs in an 'Idle state', the MAC layer transitions to the next state 'RTS TX state' by a physical interrupt. The 'DISF+Back off' event occurs due to a lapse of a short inter-frame space (SIFS) required before media access for an asynchronous data service. The 'RTS TX state' corresponds to a state in which Request To Send (RTS) can be transmitted by a MAC layer. The RTS has a meaning of requesting media access for a data service.

If an 'RTX Tx End' event occurs in the 'RTS TX state', the MAC layer transitions to the next state 'Wait for CTS state' by a physical interrupt. The 'RTX Tx End' event occurs as normal transmission of the RTS ends. The 'Wait for CTS state' corresponds to a state in which the MAC layer initiates receipt of Clear To Send (CTS) in response to the RTS. The CTS has a meaning of approving media access for a data service. However, if a 'DIFS+Contention Window' event occurs in the 'RTS TX state', the MAC layer transitions to the initial state 'Idle state' by a timer interrupt. The 'DIFS+Contention Window' event occurs when the MAC layer fails to transmit the RTS until a lapse of SIFS.

If a 'CTS Rx Start' event occurs in the 'Wait for CTS state', the MAC layer transitions to the next state 'CTS RX state' by a physical interrupt. The 'CTS Rx Start' event occurs as receipt of the CTS starts. The 'CTS RX state' corresponds to a state in which the CTS is received. However, if an 'SIFS' event occurs in the 'Wait for CTS state', the MAC layer transitions to the initial state 'Idle state' by a timer interrupt. The 'SIFS' event occurs when receipt of CTS does not start until a lapse of SIFS. That is, the MAC layer transitions to the initial state, if it fails to receive a CTS until a lapse of SIFS after transmitting an RTS.

If a 'CTS Rx End' event occurs in the 'CTS RX state', the MAC layer transitions to the next state 'Data Tx state' by a physical interrupt. The 'CTS Rx End' event occurs as receipt of the CTS ends. The 'Data Tx state' means a state in which data transmission by the MAC layer is possible. However, if a 'NAV (RTS)' event occurs in the 'CTS RX state', the MAC layer transitions to the initial state 'Idle state' by a timer interrupt. The 'NAV (RTS)' event occurs as a Network Allocation Vector (NAV) message is received in response to the RTS. The NAV message responsive to the RTS can be received from other receivers in an interval between a transmission end point of the RTS and a reception end point of a response signal to the transmitted data.

If a 'Data Tx End' event occurs in the 'Data Tx state', the MAC layer transitions to the next state 'Wait for ACK state' by a physical interrupt. The 'Data Tx End' event occurs as data transmission by the MAC layer ends. The 'Wait for ACK state' means a state in which the MAC layer waits for a response signal (Acknowledgement signal) to the previously transmitted data. However, if a 'NAV (CTS)' event occurs in the 'Data Tx state', the MAC layer transitions to the initial state 'Idle state' by a timer interrupt. The 'NAV (CTS)' event occurs as a NAV message is received in response to the CTS. The NAV message responsive to the CTS can be received from other receivers in an interval between a transmission end point of the CTS and a reception end point of a response signal to the transmitted data.

If an 'ACK Rx Start' event occurs in the 'Wait for ACK state', the MAC layer transitions to the next state 'ACK Rx state' by a physical interrupt. The 'ACK Rx Start' event occurs as receipt of a response signal to the previously transmitted data starts. The 'ACK Rx state' means a state in which a response signal to the previously transmitted data is received. However, if an 'SIFS' event occurs in the 'Wait for ACK state', the MAC layer transitions to the initial state 'Idle state' by a timer interrupt. The 'SIFS' event occurs when receipt of a response signal does not start until a lapse of SIFS. That is, the MAC layer transitions to the initial state, if it fails to receive a response signal until a lapse of SIFS after transmitting data.

If an 'ACK Rx End' event occurs in the 'ACK Rx state', the MAC layer transitions the initial state 'Idle state' by a physical interrupt because there is no next state. The 'ACK Rx End' event occurs as receipt of a response signal to the previously transmitted data ends. In addition, even though a 'NAV (CTS)' event occurs in the 'ACK Rx state', the MAC layer transitions to the initial state 'Idle state' by a timer interrupt. As described above, the 'NAV (CTS)' event can occur even in the 'ACK Rx state'.

It can be understood from the foregoing description that the state machine proposed in the present invention takes into account both the physical events and time events in each state.

Figure 5:
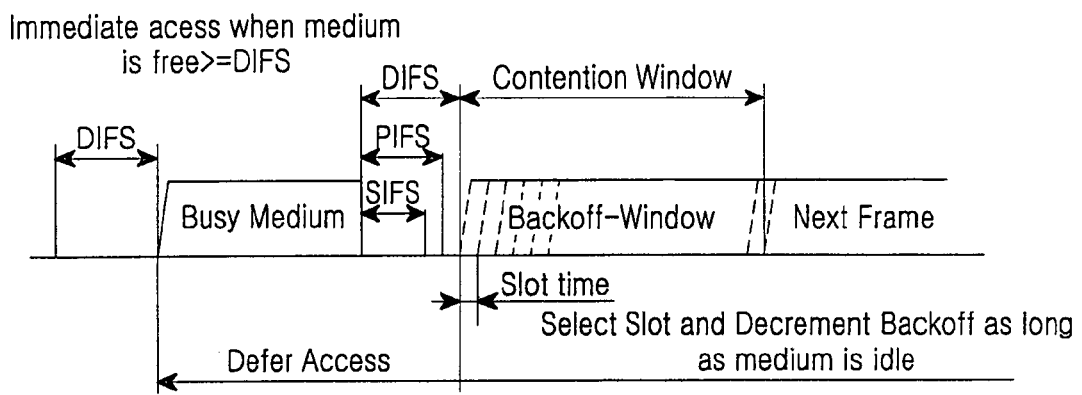
FIG. 5 is a diagram illustrating a basic access method in a wireless network to which the present invention is applicable.
Figure 6:
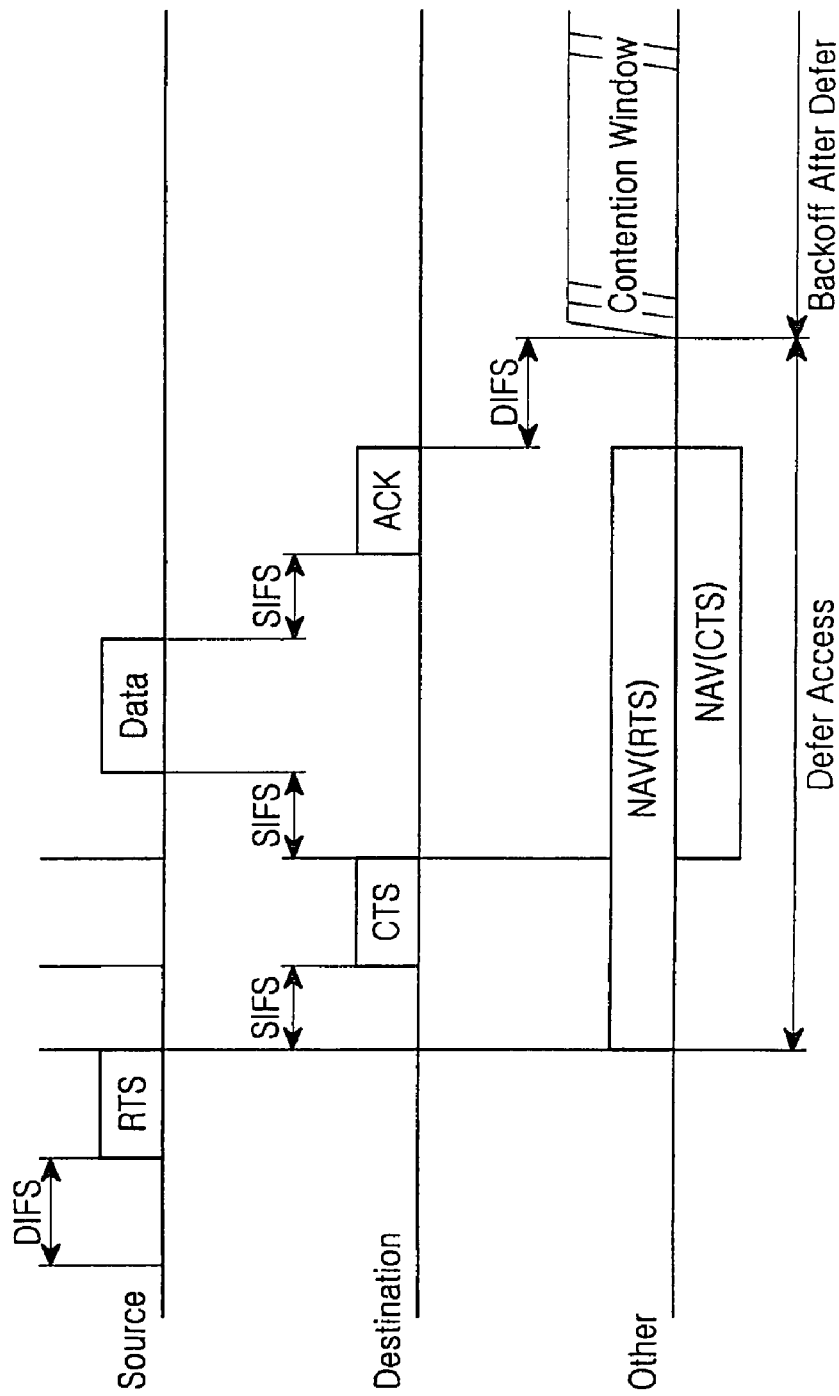
FIG. 6 is a diagram illustrating signal processing timing achieved in a wireless network to which the present invention is applicable.

FIG. 5 illustrates a basic access method in a wireless network to which the present invention is applicable, and FIG. 6 illustrates signal processing timing achieved in a wireless network to which the present invention is applicable.

The signal processing timings shown in FIGS. 5 and 6 show the occurrence of the various events in FIG. 4. The signal processing timing shown in FIG. 6 has already been described with reference to FIG. 4, so a detailed description thereof will be omitted.

Figure 7:
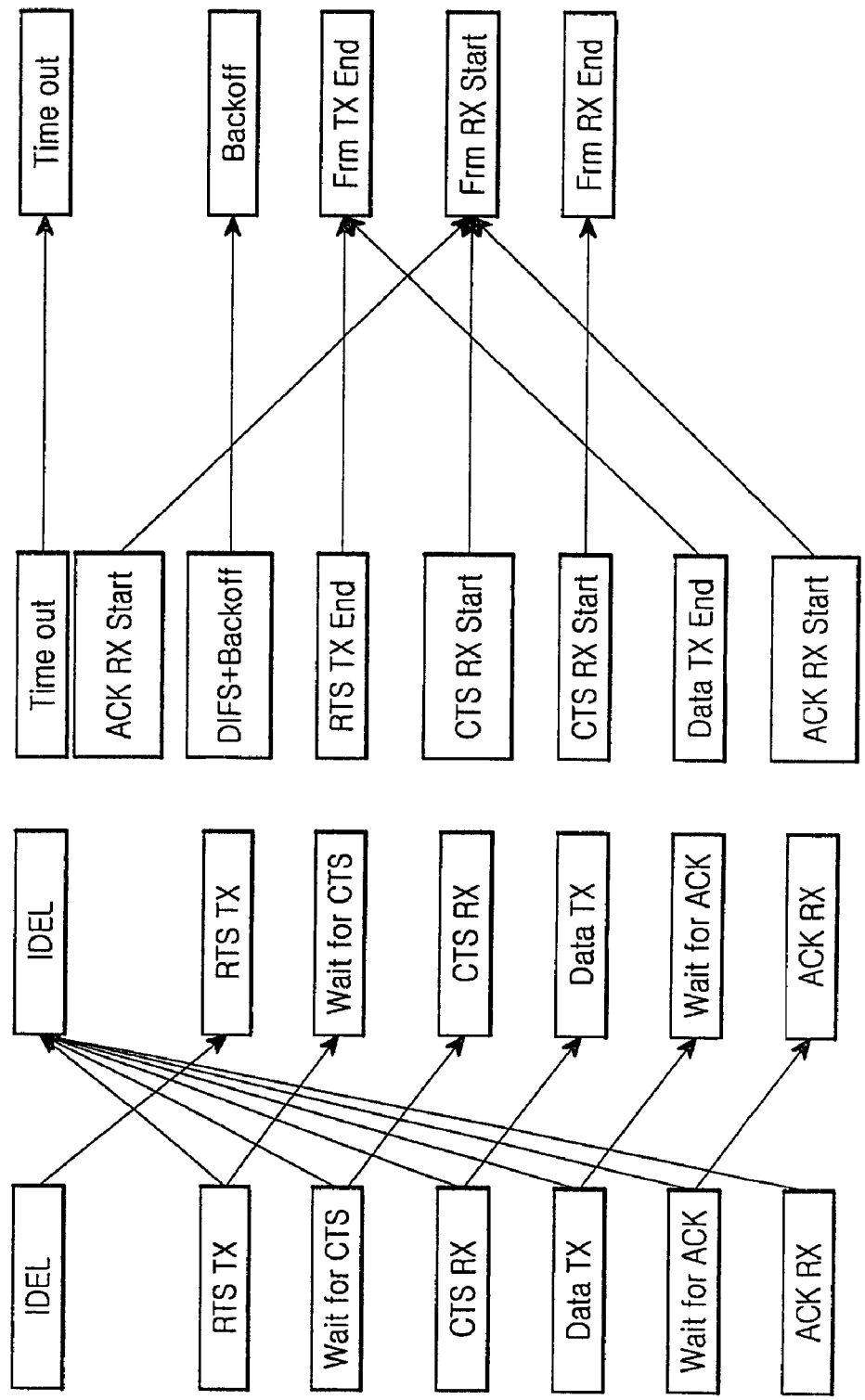
FIG. 7 is a diagram illustrating operation state transition based on an event occurring in a wireless network to which an example of the present invention is applicable.

FIG. 7 illustrates operation state transition based on an event occurring in a wireless network to which an example of the present invention is applicable.

It can be noted from FIG. 7 that application of the state machine proposed in the present invention contributes to simplification of a routine between the transitioning events. In addition, even for the timer interrupt, the routine is simplified.

As shown in FIG. 7, the proposed state management method by a MAC layer in the wireless network determines the next occurable physical interrupts for each state. In addition, the proposed method configures a link of the states according to the determination result, and transitions to the state scheduled to be linked next, when a physical interrupt occurs in each state. Further, the method allows transition to the initial state when a timer interrupt occurs in each state.

If a physical interrupt occurs in the last state among the linked states, the method transitions to the initial state. In addition, if the physical interrupt occurs in association with a physical event, the timer interrupt occurs in association with a timer event.

As can be understood from the foregoing description, the present invention directly applies the MAC protocol designed with the state machine to the software technology, and configures the state machine with physical events and timer events, thereby facilitating easy management of the state machine in the ISR. In addition, the present invention optimizes comparison branch statements, contributing to simplification of the ISR.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for managing states by a Media Access Control (MAC) layer in a wireless network, the method comprising:
   determining next occurable physical interrupts for each of the states and outputting a determination result indicative thereof;
   configuring a link of the states according to the determination result;
   transitioning to a state to be linked next in response to a physical interrupt occurring in each of the states; and
   transitioning to an initial state in response to a timer interrupt occurring in each of the states,
   wherein the physical interrupt occurs in response to an operation performed according to each of the states, and the timer interrupt occurs in response to the operation being performed after an expiration of a predetermined time.

2. The method of claim 1, wherein the MAC layer transitions to the initial state in response to a physical interrupt occurring in a last state among the linked states.

3. The method of claim 2, wherein the physical interrupt occurs in association with a physical event.

4. The method of claim 3, wherein the timer interrupt occurs in association with a timer event.

5. The method of claim 1, wherein the determining of the next occurable physical interrupts for each of the states, the configuring of the link of the states according to the determination result, the transitioning to the state to be linked next in response to the physical interrupt occurring in each of the states, and the transitioning to the initial state in response to the timer interrupt occurring in each of the states are each performed by a computer.

6. A method of managing a plurality of states by a Media Access Control (MAC) layer in a wireless network of computers, the method comprising:
   transitioning from an initial state of the plurality of states to a second state of the plurality of states in response to a physical interrupt occurring by operation according to the initial state and performed in the initial state in at least one of the computers;
   transitioning to the initial state in response to a timer interrupt occurring in the second state in the at least one of the computers; and
   transitioning to the initial state in response to the physical interrupt occurring by operation according to the second state and performed in the second state, and in response to the second state being a final state of the plurality of states in the at least one of the computers,
   wherein the timer interrupt occurs in response to the operation according to the second state performed after an expiration of a predetermined time.

7. The method of claim 6, further comprising:
   transitioning to a subsequent state of the plurality of states upon each occurrence of a physical interrupt in a previous state in response to the subsequent state not being the final state; and
   transitioning to the initial state in response to the subsequent state being the final state.

8. The method of claim 1, wherein a predetermined time for the timer interrupt of one of the states is different from a predetermined time for the timer interrupt of another state, or is the same as the predetermined time for the timer interrupt of the another state.

9. The method of claim 1, wherein one of the physical interrupt and the timer interrupt is firstly occurs in the initial state.

10. The method of claim 6, wherein the predetermined time is different from a predetermined time for the timer interrupt of the first state, or is the same as the predetermined time for the timer interrupt of the first state.

11. The method of claim 6, wherein one of a physical interrupt and a timer interrupt is firstly occurs in the initial state.

* * * * *